G. BERCHTOLD.
CULINARY UTENSIL.
APPLICATION FILED SEPT. 17, 1917.

1,287,839.

Patented Dec. 17, 1918.

UNITED STATES PATENT OFFICE.

GUSTAVE BERCHTOLD, OF MILWAUKEE, WISCONSIN.

CULINARY UTENSIL.

1,287,839.
Specification of Letters Patent.
Patented Dec. 17, 1918.

Application filed September 17, 1917. Serial No. 191,718.

*To all whom it may concern:*

Be it known that I, GUSTAVE BERCHTOLD, a citizen of Switzerland, having declared my intention to become a citizen of the United States, and resident of Milwaukee, in the county of Milwaukee and State of Wisconsin, have invented certain new and useful Improvements in Culinary Utensils; and I do hereby declare that the following is a full, clear, and exact description thereof.

My invention relates to articles for use in the culinary pursuits, particularly devices for slicing or shredding vegetables or fruits.

In preparing vegetables and fruits for cooking it is sometimes necessary to slice them in the form of long, thin strips, this being particularly the case in preparing "Julian" potatoes. When such potatoes are prepared manually, the strips are of varying sizes, therefore the present invention has been devised whereby material may be shredded or sliced uniformly.

A further object of the invention is to provide a device whereby fruits and vegetables may be prepared much more quickly than by hand.

A still further object is to provide a simply constructed and improved article, which can be inexpensively manufactured and will be very efficient in operation.

With the foregoing and other objects in view the invention consists in certain novel features of construction, combination and arrangement of parts, which will be hereinafter more particularly described and claimed.

In the accompanying drawing:—

Figure 1:
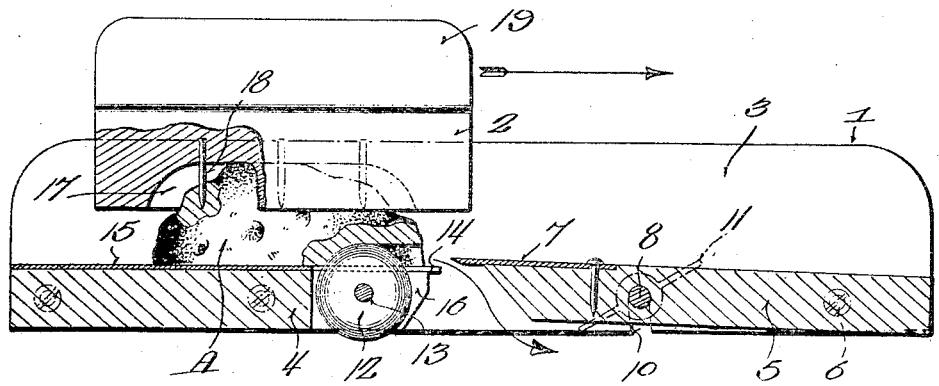
Figure 2:
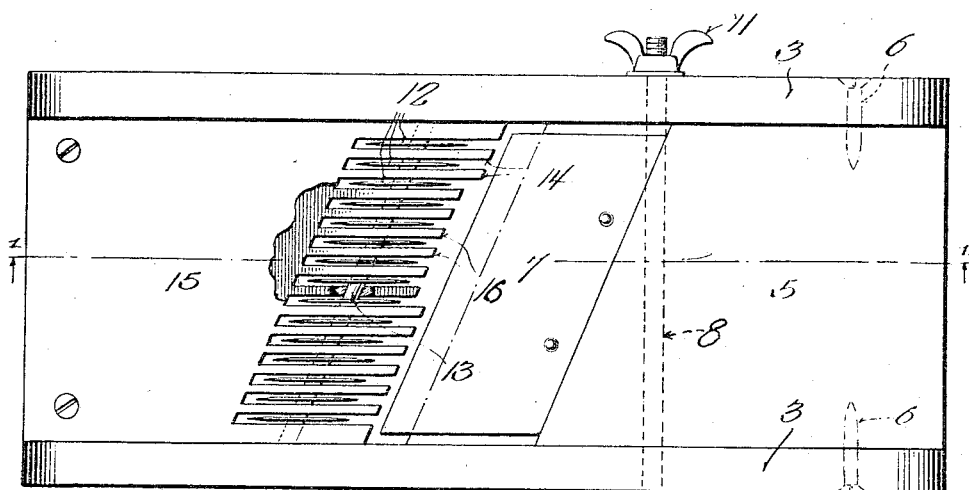

Figure 1 represents a vertical, longitudinal, sectional view through a utensil constructed in accordance with my invention, said section being taken substantially upon the plane of the line 1—1 of Fig. 2, and Fig. 2 is a plan view of the invention, certain parts being broken away to more clearly illustrate the construction.

Referring more particularly to the drawing, it will be seen that the invention consists essentially of two parts, a tray 1, which carries the cutting blades, and a material holding block 2. The last mentioned part is used for moving the fruit or vegetable A over the bottom of the tray between the sides 3 thereof.

It will be noted that the tray consists essentially of the sides 3 and the bottom formed of relatively stationary and pivoted portions 4 and 5 respectively. The ends of the tray are preferably open. The inner adjacent end of the two parts of the bottom are spaced apart and the movable portion is capable of being adjusted vertically with respect to the adjacent end of the stationary portion, said movable portion being pivoted at its outer end between the sides 3 as at 6. The inner end carries a cutting blade 7 whose edge is always positioned in a horizontal plane and at an incline to the side walls 3.

For the purpose of holding the cutting edge of the blade in adjusted positions the free end portion of the part 5 of the bottom is provided with a transversely extending rod 8 whose outer ends project beyond the sides of the tray and are threaded as at 9. These projecting ends are disposed in notches 10 cut in said walls 3 and are provided with wings nuts 11, which, when they are tightened, bind against the walls 3 and hold the bottom part 5 against movement. It will be seen that as the potato or other vegetable or fruit A is moved longitudinally of the tray, it will be brought into engagement with the cutting edge of the blade 7, which, being horizontal and parallel to the stationary portion of the bottom, will slice a thickness of potato from the main part, this severed portion passing downwardly between the inner ends of the two parts of the bottom in the direction of the arrow. The thickness of the slices depend upon the vertical distance between the cutting edge of the blade and the plane of the bottom part 4.

In order that the slice, which is severed by the blade 7, may be divided into a number of thin strips or shreds, a plurality of cutting disks 12 are disposed to project upwardly and above the upper face of the bottom part 4, these disks being disposed to freely rotate on a transverse shaft 13 which extends transversely of the tray. This shaft is preferably disposed parallel to the cutting edge of the blade 7, the disks, however, being parallel to each other and to the sides 3. The distance between the several cutting disks is dependent upon the thickness of the slices or shreds to be formed. The disks being free to rotate and slide on the shaft 13 are held in spaced relation by fingers 14, which are formed on the inner edge of a plate 15 which covers the upper face of the stationary part 4 of the bottom, and also by similar fingers 16 provided on the inner edge of said stationary bottom part. By such an arrangement the material to be shredded will be simultaneously sliced in two directions, that is to say, both transversely and longitudinally, the transverse cutting being provided by the plurality of disks, while the other cut is performed by the blade 7.

The material holding block 2, which is used in connection with the tray, is designed to properly guide the vegetable or fruit and to prevent the operator's hand from coming in contact with the cutting blades. The main portion of the block is preferably of a width substantially equal to the distance between the sides 3 and is provided with a cavity 17 into which several spikes 18 project, the latter being adapted to extend into the potato or the like A, as shown in Fig. 1. The block is also provided with lateral flanges 19 which project from opposite sides and over the sides 3 of the tray. After a considerable portion of the potato has been shredded, it is obvious that the block 2 will move downwardly toward the bottom of the tray. The function of the flanges 19 is to prevent the block from moving downwardly to a too great extent, or in other words, said flanges will prevent the engagement of the bottom of the block with the cutting blades. Various changes may be made in the form and proportion of the several parts of the tray and material holding block to accommodate the invention for use with different classes of fruits and vegetables, although it is designed primarily for shredding potatoes.

With this invention the cost of manufacture of devices of this character is greatly reduced owing to the simple manner of assemblage and the cheapness of the various parts. For instance after the fingers 16 are formed in the bottom 4 an oblique hole is drilled transversely through said bottom midway said fingers to receive the shaft 13, the ends of which terminate at the sides of the bottom. Before disposing the shaft in its hole the said cutting disks 12 are placed between the fingers 16, but after said cutting disks and the shaft are in position the sides 3 of the tray are secured to the bottom and thus the ends of the transverse opening which receive the shaft 13 are closed and said shaft held against longitudinal movement. Said sides 3 of the tray thus form the means for holding the cutting disks 12 and the shaft 13 in assembled relation with the bottom.

I claim:—

A vegetable cutter comprising a tray having its bottom provided with a series of open end slots extending longitudinally of said bottom and obliquely alined to form guard fingers, a series of thin centrally apertured revoluble cutting disks, one being loosely fitted between each pair of fingers, a fixed bearing shaft extending through the series of fingers and disks, the shaft being disposed obliquely of the longitudinal axis of the tray and terminating at the edges of the tray bottom, said cutting disks having play on the oblique shaft and in said slots to permit ready rotation thereof about the former, side walls secured to said tray bottom to engage and confine the shaft against endwise movement, and a cutting plate carried by the bottom opposite the cutting disks.

In testimony that I claim the foregoing I have hereunto set my hand at Milwaukee, in the county of Milwaukee and State of Wisconsin.

GUSTAVE BERCHTOLD.